United States Patent [19]

Tamura

[11] Patent Number: 4,458,264
[45] Date of Patent: Jul. 3, 1984

[54] APPARATUS AND METHOD FOR READING MULTI-COLOR ORIGINAL

[75] Inventor: Yasuyuki Tamura, Kawasaki, Japan

[73] Assignee: Canon Kabushiki Kaisha, Tokyo, Japan

[21] Appl. No.: 339,167

[22] Filed: Jan. 13, 1982

[30] Foreign Application Priority Data

Jan. 20, 1981 [JP] Japan ................................ 56-7024

[51] Int. Cl.³ ............................................. H04N 1/46
[52] U.S. Cl. ................................................... 358/75
[58] Field of Search ........................................ 358/75

[56] References Cited

U.S. PATENT DOCUMENTS

| | | | |
|---|---|---|---|
| 2,567,240 | 9/1951 | Sites | 358/75 |
| 4,318,122 | 3/1982 | White | 358/75 |
| 4,367,946 | 1/1983 | Varner | 358/75 |

Primary Examiner—Richard Murray
Attorney, Agent, or Firm—Fitzpatrick, Cella, Harper & Scinto

[57] ABSTRACT

A multi-color original reading apparatus comprises a single image sensor for sensing a multi-color original image, a plurality of light sources for illuminating the original image with lights of different colors, while turning on and off the light sources, and a driver for driving the image sensor in time with the turning on and off of the light sources.

6 Claims, 9 Drawing Figures

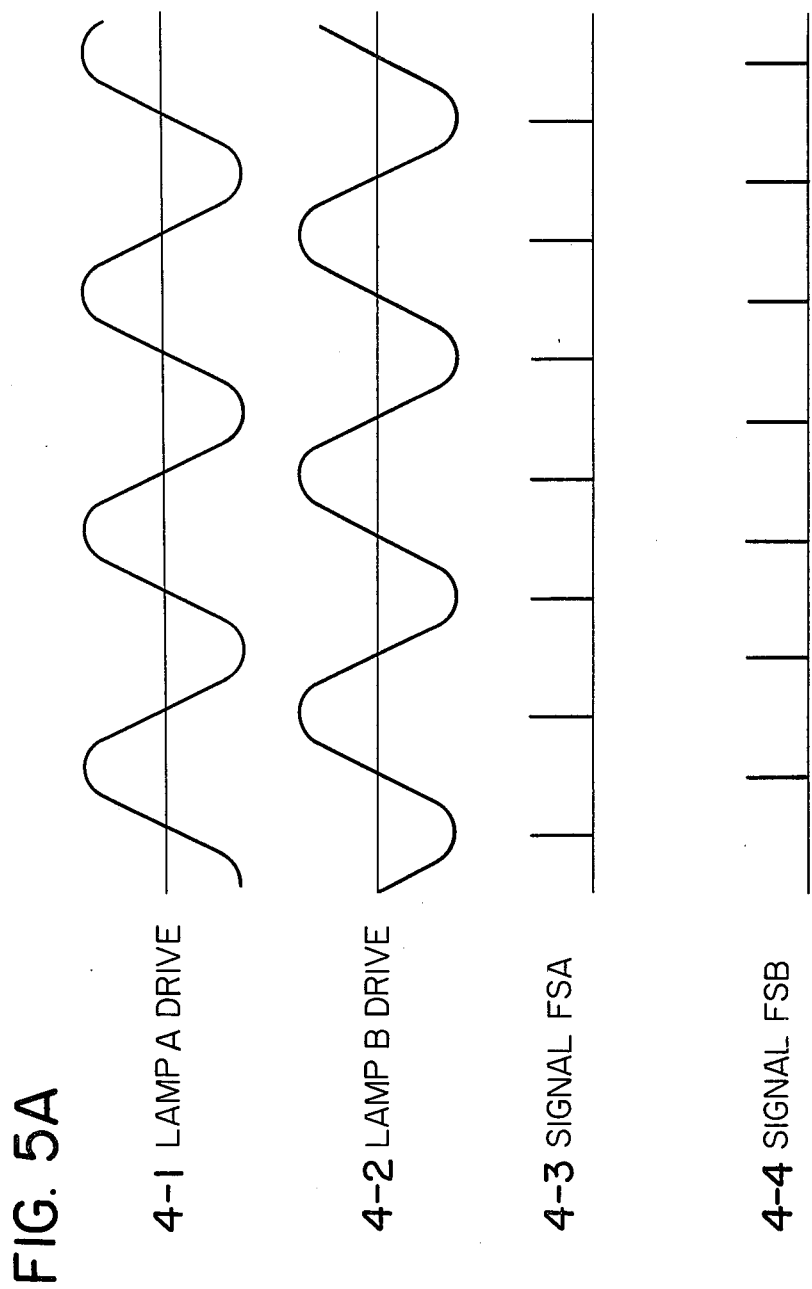

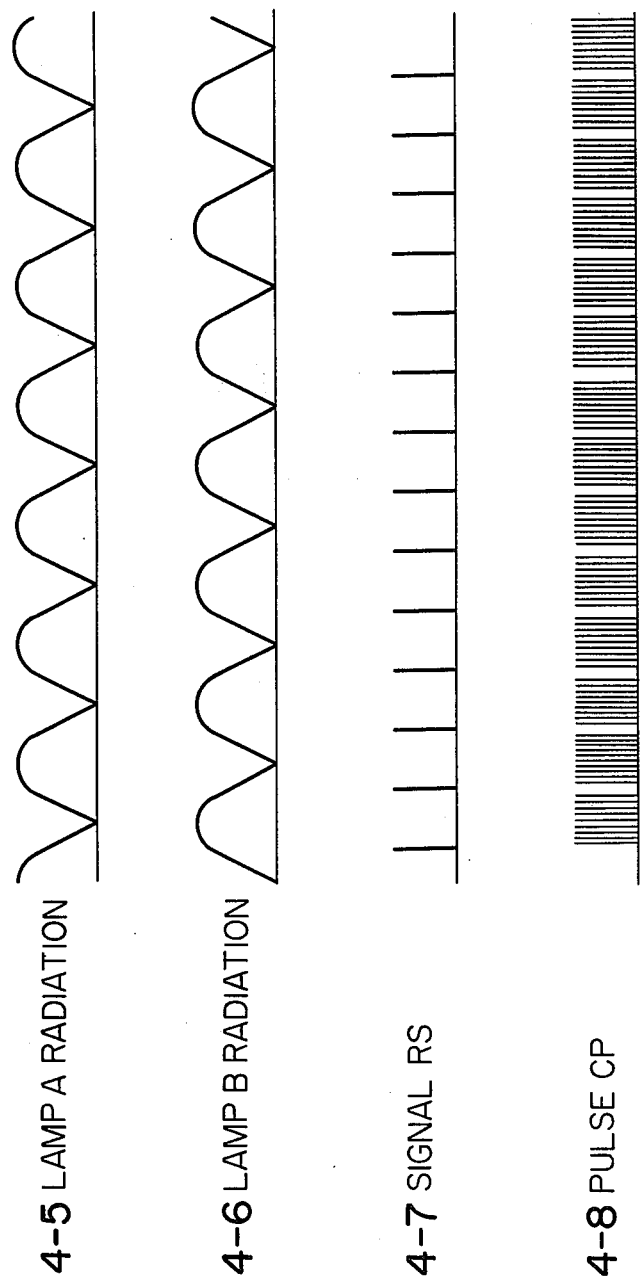

APPARATUS AND METHOD FOR READING MULTI-COLOR ORIGINAL

BACKGROUND OF THE INVENTION

1. Field of the Invention

The present invention relates to an apparatus and method for reading a multi-color original with a solid-state imaging device such as a charge-coupled device to obtain image information containing color information.

2. Description of the Prior Art

There is already known image processing in which an original image is read as electric signals by a solid-state image device and the image information obtained as electric signals is utilized for reproduction of the image on a recording material such as paper, display on a display device such as a cathode ray tube or transmission to a distant location for example through a facsimile device. Such image processing has mostly been based on monochromatic processing of the image. Recently, however, there is being proposed processing of image information bearing color information by reading also such color information from the original.

The image information bearing color information is obtained from a multi-color original generally by color decomposition of the original with plural imaging devices respectively positioned in different optical paths having color separating filters of different color transmission characteristics. In such method, however, a slight positional aberration or difference in sensitivity between the imaging devices may cause color distortion which is extremely difficult to correct. Also the use of plural units of expensive imaging devices such as charge-coupled devices inevitably raises the cost of the apparatus.

Also as an alternative method for obtaining image information bearing color information with a single imaging device, the color separation for example for industrial television cameras can be achieved by rotating a filter disk having plural colors at a high speed in front of the imaging device. However such method requires a complicated large-sized mechanism for accurately rotating the filter disk at a high speed, and is inevitably associated with mechanical noises.

SUMMARY OF THE INVENTION

The object of the present invention is to provide a multi-color original reading apparatus capable of effecting color separation of an original image with a simple structure.

Another object of the present invention is to provide a multi-color original reading apparatus capable of separating plural colors with a single solid-state imaging device.

Still another object of the present invention is to provide a multi-color original reading apparatus capable of efficiently obtaining color information from the original image.

Still another object of the present invention is to provide a multi-color original reading apparatus capable of effecting satisfactory color separation without fine adjustments.

The above-mentioned and still other objects of the present invention will be made apparent from the following description of the preferred embodiments.

BRIEF DESCRIPTION OF THE DRAWINGS

FIGS. 5A and 5B are timing charts showing various signals in the circuit shown in FIG. 4.

DESCRIPTION OF THE PREFERRED EMBODIMENTS

The present invention is featured in obtaining plural color information by means of a single solid-state imaging device, and more specifically alternately illuminating an original with intermittent light sources of mutually different colors which can be of specific wavelengths such as light-emitting diodes or neon discharge tubes, or which can be white light sources such as fluorescent lamps combined with color separating filters, receiving the reflected light with the solid-state imaging device and reading the image information from said imaging device in synchronization with the intermittent function of the light sources, thereby detecting the reflected light corresponding to the light source of each color and obtaining image information containing color information by the color separation in this manner.

Figure 1:
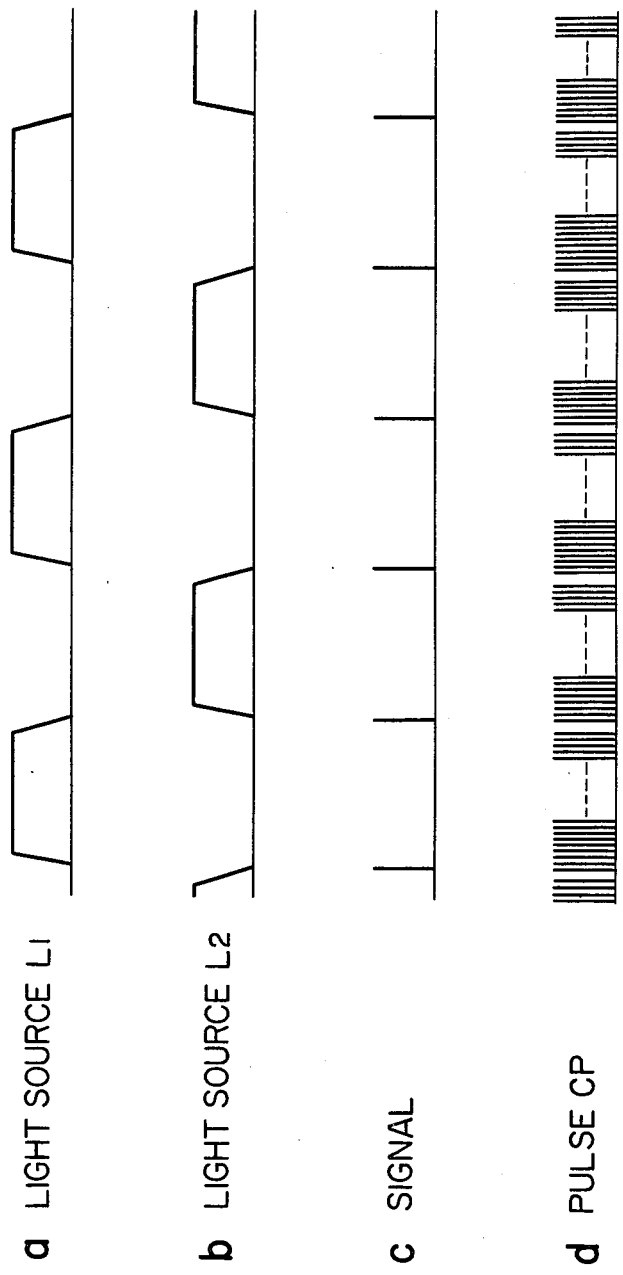
FIGS. 1a-d are timing charts showing the outline of the present invention.

Now reference is made to FIG. 1 explaining an embodiment of the present invention, in which the color information of red, black and white in the original image is read with a light source L1 of white light and another light source L2 of red light.

As shown by the curves a and b in FIG. 1, the light sources L1 and L2 are alternately lighted. The imaging device, or the charge-coupled device, reads the image signals corresponding to the density of the original in response to the white-light illumination by the light source L1, starts the signal transmission in response to a signal readout start signal RS supplied immediately after said white-light illumination as shown by chart c in FIG. 1, and transfers the image signals in synchronization with transfer clock pulses CP shown by chart d in FIG. 1. After the termination of said white-light illumination the light source L2 starts the illumination with red light, and the imaging device reads the reflected image corresponding to the red light. In the reading of the original the white area and red area are detected as white signals while other areas are detected as black signals. The obtained image signals are read from the imaging device in response to a signal readout start signal RS supplied immediately after the red-light illumination as shown by the chart c in FIG. 1 and are transferred in synchronization with the transfer clock pulses CP shown in the chart d in FIG. 1.

The above-mentioned procedures are repeated to alternately provide signals solely representing the density of the original image and signals representing the density of image areas other than red ones, thus effecting the color separation of the original image.

The obtained signals involving information corresponding to the lights of different colors are subjected to the following logic processing to obtain image information identifying the white, red and black areas of the original image. In the processing an area giving a white signal in response to the white light is identified as white, and an area giving a black signal in response to the white light is identified as black or red respectively when the area gives a black signal or a white signal in response to the red light.

Figure 2:
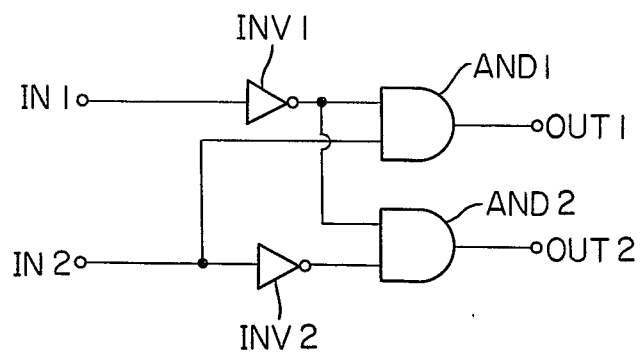
FIG. 2 is a circuit diagram showing an embodiment of a logic circuit for forming plural color information from the image signals read from the original image.

FIG. 2 shows an embodiment of a logic circuit for executing said logic processing, in which input terminals IN1, IN2 respectively receive the signals read in response to the white light and those read in response to the red light. The white and black signals are respectively represented by high (H) level and low (L) level.

In said circuit there are provided inverters INV1, INV2, and AND gates AND1, AND2.

Signals from output terminals OUT1, OUT2 represent red when the terminal OUT1 is at the H-level; black when the terminal OUT2 is at the H-level; and white when both terminals are at the L-level. Said signals are supplied for example to a printer capable of recording red color or black color respectively in response to the H-level signal from the terminal OUT1 or OUT2.

The states of the above-mentioned input and output signals are summarized in the following logic table. Naturally the above-mentioned logic processing can also be achieved easily by a suitable sequence program.

| IN1 | IN2 | OUT1 | OUT2 | Result |
|-----|-----|------|------|--------|
| H   | H   | L    | L    | White  |
| H   | L   | L    | L    | White  |
| L   | H   | H    | L    | Red    |
| L   | L   | L    | H    | Black  |

Figure 3:
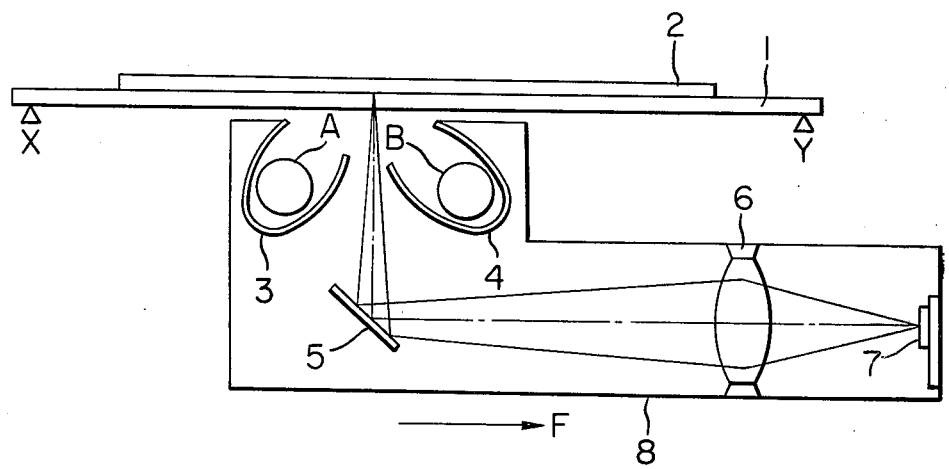
FIG. 3 is a cross-sectional view showing an embodiment of a multi-color original reading unit of the present invention.

FIG. 3 shows an embodiment of an original reading unit of the present invention, wherein shown are an original carriage 1 composed of a transparent planar glass plate; an original document 2 having multi-color information and placed on said original carriage 1; light sources 3, 4 composed of fluorescent lamps A, B and corresponding reflectors for illuminating said original 2 placed on the original carriage 1; a mirror 5; a lens 6; a solid-state imaging device 7 composed of a linear charge-coupled device (CCD) for reading the image information of one line in the vertical or horizontal direction on the original 2 upon reception of the light reflected by said original 2 and transmitted through said mirror 5 and lens 6.

Said light sources 3, 4, mirror 5, lens 6 and CCD7 are integrally supported to constitute an optical system 8, which is moved at a constant speed in a direction F from a scan start point X to a scan end point Y by known driving means to scan the entire area of the original.

The fluorescent lamps A and B respectively emit white light and red light. The fluorescent lamp is suitable for the purpose of the present invention as it can be turned on and off at a high speed and can provide the light of a determined wavelength. The lamps A and B are lighted alternately by pulse voltages of mutually different phases. Consequently the original 2 is alternately exposed to the white light from the fluorescent lamp A and the red light from the lamp B according to the timing determined by the frequency of said pulse voltages.

Figure 4:
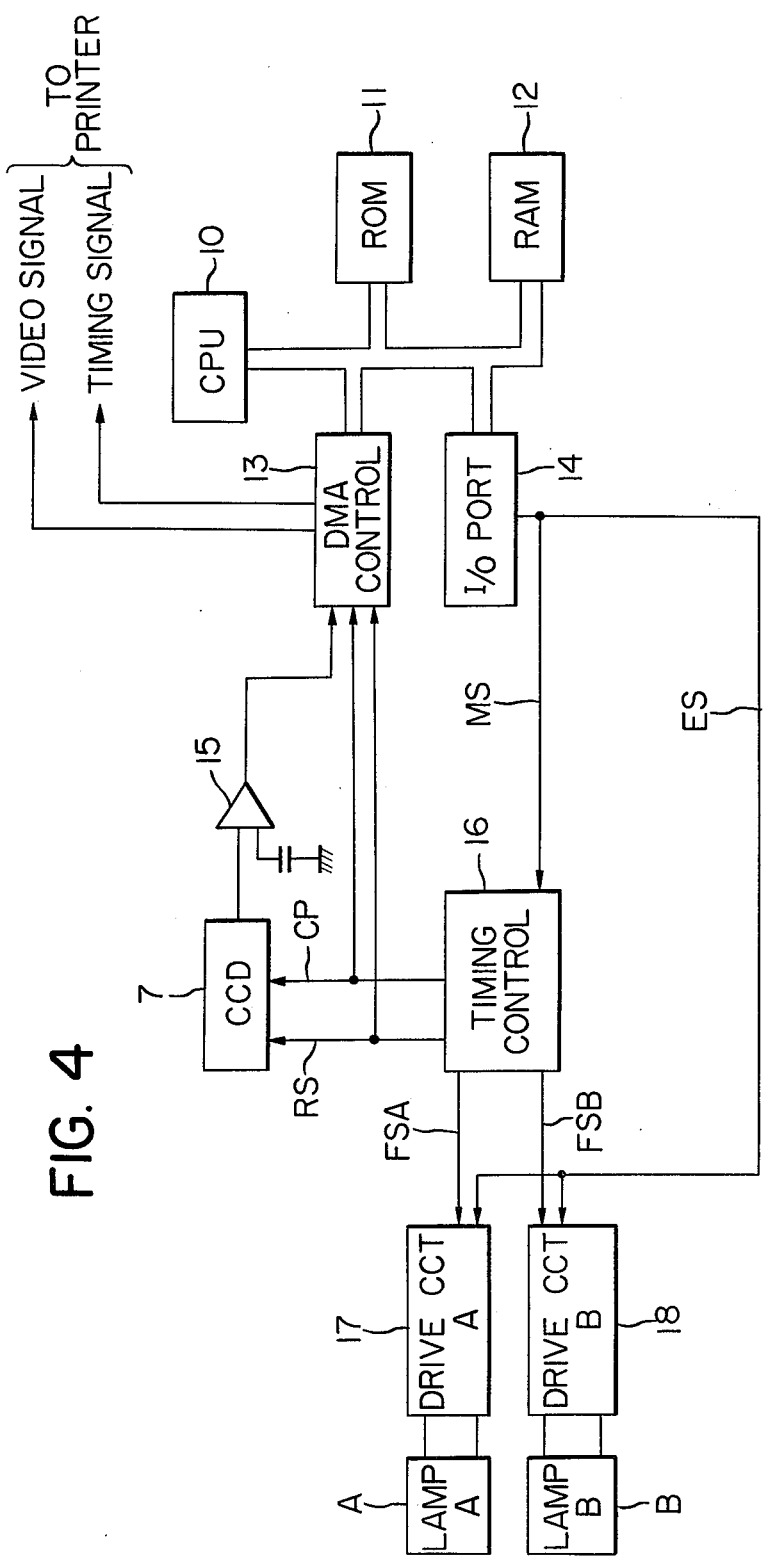
FIG. 4 is a block diagram showing an embodiment of a circuit for controlling the reading function.

FIG. 4 shows, in a block diagram, an embodiment of the circuit for driving the image reading unit shown in FIG. 3 and for processing the obtained image signals. In FIG. 4 there are shown a central processing unit (CPU) composed of a known microcomputer for controlling the functions of the apparatus; a read-only memory (ROM) 11 for storing the control programs for said CPU 10; a random access memory (RAM) 12 for temporarily storing the image signals read from the image and further storing the image signals containing color information obtained through the aforementioned signal processing; a DMA controller 13 for controlling the DMA transfer of the image signals; an input/output port 14; a comparator 15; a timing controller 16 for releasing timing signals for controlling the various units in response to the instructions from said CPU 10; a CCD image sensor 7 having a reading capacity of 1728 pixels for reading a line image of 210 mm, corresponding to the width of A4 size, in one scanning; fluorescent lamps A and B respectively emitting white light and red light, and lamp drive circuits 17, 18 for respectively controlling the function of said lamps A and B.

FIGS. 5A and B are timing charts showing various signals in the circuit shown in FIG. 4, in which 4-1 is a power supply for driving the lamp A; 4-2 is a power supply for driving the lamp B, which is different by 90° in phase from said power supply 4-1; 4-3 and 4-4 are flash start signals FSA, FSB to be supplied respectively to the lamp drive circuits 17, 18; 4-5 and 4-6 are flashes respectively from the lamps A and B; 4-7 is a readout start signal RS for reading signals from the CCD; and 4-8 is transfer clock pulse CP for the CCD.

Now there will be given an explanation on the function of the apparatus, while making reference to FIGS. 3, 4 and 5. At the image reading, the CPU 10 supplies an image reading signal MS indicating the start of a function to the timing controller 16 through the input/output port 14, and simultaneously supplies an enable signal ES to the lamp drive circuits 17, 18 to enable the function of the lamps A, B. Upon receipt of said signal MS, the timing controller 16 supplies the readout start signal RS (4-7 in FIG. 5) to the CCD 7, the flash start signals FSA, FSB (4-4, 4-5 in FIG. 5) to the lamp drive circuits 17, 18, and the transfer clock pulses CP (4-8 in FIG. 5) to the CCD 7 with the timing shown in FIG. 5. In response to said flash start signals, the lamp drive circuits 17, 18 turn on and off the lamps A and B as shown by 4-5 and 4-6 in FIG. 5. Although the lamps A and B do not so sharply function as shown in FIG. 1, the state of lighting shown in FIG. 5 is acceptable in practice. Simultaneously with said reading start signal MS, the optical system 8 shown in FIG. 3 starts to move in the direction F.

As already outlined in relation to FIG. 1, the timing controller 16 releases the readout start signal RS to the CCD 7 immediately after the flash of each color, followed by the transfer clock pulses CP of a number (for example 2048 pulses) enough for transferring all the image signals for 1728 pixels from the CCD 7, whereby the image signals corresponding for example to the white light are serially supplied to the comparator 15 in synchronization with said clock pulses CP. The comparator 15 digitizes the analog image signals received from the CCD 7 according to a determined threshold value and sends the thus obtained digital signals to the DMA controller 13, which supplies the image signals of 1728 pixels, obtained in one scanning of the CCD 7, as a unit to the RAM 12 in response to a timing control signal supplied from the timing controller 16 in synchronization with the signal reading from the CCD 7.

The RAM 12 thus stores the image signals corresponding to the white light. Subsequently the image signals corresponding to the red light are similarly stored in the RAM 12. The image signals corresponding to the lights of two colors and stored in the RAM 12 are then subjected to the aforementioned signal processing in the CPU 10 to form image information in which white, red and black areas are identified.

The original scanning position with the white light illumination is different by a scanning pitch from that with the red light illumination due to the displacement of the optical system shown in FIG. 3, but said difference is very small and is practically negligible. Also said difference can be further reduced by the use of light sources capable of functioning at a high speed and an imaging device allowing high-speed signal write-in and read-out. In this manner the image signals corresponding to the white light and those corresponding to the red light constituting alternating lines are read to provide the image information, bearing color information, for the entire image.

As explained in the foregoing, the present invention allows the obtaining of image information, bearing information for plural colors, by means of a single imaging device, thus avoiding the elaborate positional adjustments required in the use of plural imaging devices. Also the apparatus can be made compact due to the simple structure involved, and the reading function can be executed at a high speed by the use of high-speed light sources and a high-speed imaging device.

Although the present invention has been explained by an embodiment for obtaining image information bearing color information for red, black and white with two fluorescent lamps of white and red colors as the light sources, it is naturally possible to obtain the color information for other colors by the use of light sources of other colors, and also to read originals of any colors by three-color separation through the use of three light sources of red, green and blue. Furthermore said fluorescent lamps can be replaced by discharge tubes such as neon lamps, or by still other light sources such as light-emitting diodes in case the relatively low intensity of the light sources is permitted by the high sensitivity of the imaging device.

Also the foregoing embodiment has been limited to a mechanism in which the original image is scanned by the displacement of an optical system integrally composed of the imaging device, light sources, mirror etc., but the present invention is also applicable to an apparatus in which the original carriage is displaced in relation to a fixed optical system, and the optical system can naturally be of a known structure.

What I claim is:

1. An apparatus for reading a multi-color original comprising:
   plural light sources for illuminating an original with lights of mutually different colors;
   an imaging device for reading an original image based on reflected light from said original;
   control means for turning on and off said plural light sources to sequentially illuminate the original with lights of mutually different colors;
   signal means for producing a read-out start signal for causing said imaging device to perform the reading operation according to exposure of each color, in synchronism with the turning on and off of said plural light sources;
   transfer means for generating a transfer signal to transfer a read image signal from said imaging device based on said read-out start signal; and
   process means for processing the image signals sequentially derived from said imaging device, each image signal being associated with one of the lights of mutually different colors, and for forming a color image signal.

2. An apparatus according to claim 1, wherein said original and said imaging device are movable relative to each other so that said imaging device reads the original image over the area of said original.

3. An apparatus according to claim 1, wherein said control means turns said plural light sources on and off with mutually different timing signals.

4. An apparatus according to claim 1, wherein said imaging device is a linear image sensor.

5. An apparatus according to claim 1, wherein said signal means produces said read-out start signal immediately after the light illumination.

6. An apparatus according to claim 1, wherein said transfer means generates a pulse-like configuration of transfer signal times sufficient for transferring all image signals from said imaging device.

* * * * *